United States Patent
Nakayama et al.

(10) Patent No.: US 10,673,154 B2
(45) Date of Patent: Jun. 2, 2020

(54) POWER STORAGE MODULE AND CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Osamu Nakayama, Mie (JP); Naoki Fukushima, Mie (JP); Katsushi Miyazaki, Mie (JP); Seishi Kimura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/214,917

(22) Filed: Dec. 10, 2018

(65) Prior Publication Data
US 2019/0181569 A1 Jun. 13, 2019

(30) Foreign Application Priority Data
Dec. 11, 2017 (JP) ................... 2017-236691

(51) Int. Cl.
*H01R 3/00* (2006.01)
*H01R 11/28* (2006.01)
(Continued)

(52) U.S. Cl.
CPC ........... *H01R 11/288* (2013.01); *H01G 11/10* (2013.01); *H01M 2/1077* (2013.01);
(Continued)

(58) Field of Classification Search
CPC .............................. H01R 11/288; H01M 2/20
(Continued)

(56) References Cited

U.S. PATENT DOCUMENTS 9,214,752 B2 * 12/2015 Liu ....................... H01M 2/202
2018/0315973 A1 11/2018 Nakayama et al.

FOREIGN PATENT DOCUMENTS

JP       2013-033634     2/2013
JP       2017-84491      5/2017

* cited by examiner

*Primary Examiner* — Phuong Chi Thi Nguyen
(74) *Attorney, Agent, or Firm* — Greenblum & Bernstein, P.L.C.

(57) ABSTRACT

A power storage module has a plurality of power storage elements whose electrode terminals, which include a positive electrode and a negative electrode, are arranged on an electrode arrangement surface, and a connection module that is mounted to the electrode arrangement surface of the plurality of power storage elements. The connection module has an insulating protector holding a bus bar, which connects adjacent electrode terminals of the plurality of power storage elements. The insulating protector has a front wall and a rear wall that intersect a virtual plane that is parallel to the electrode arrangement surface. The front wall and the rear wall are respectively provided with protruding portions, and the protruding portions that are respectively provided on the front wall and the rear wall engage with a plurality of extending portions that are provided on the electrode arrangement surface of the plurality of power storage elements.

13 Claims, 8 Drawing Sheets

(51) Int. Cl.
*H01M 2/10* (2006.01)
*H01M 2/30* (2006.01)
*H01G 11/10* (2013.01)
*H01M 2/20* (2006.01)

(52) U.S. Cl.
CPC ............ *H01M 2/206* (2013.01); *H01M 2/30* (2013.01); *H01M 2220/20* (2013.01)

(58) Field of Classification Search
USPC ................................................ 439/500, 627
See application file for complete search history.

FIG.7
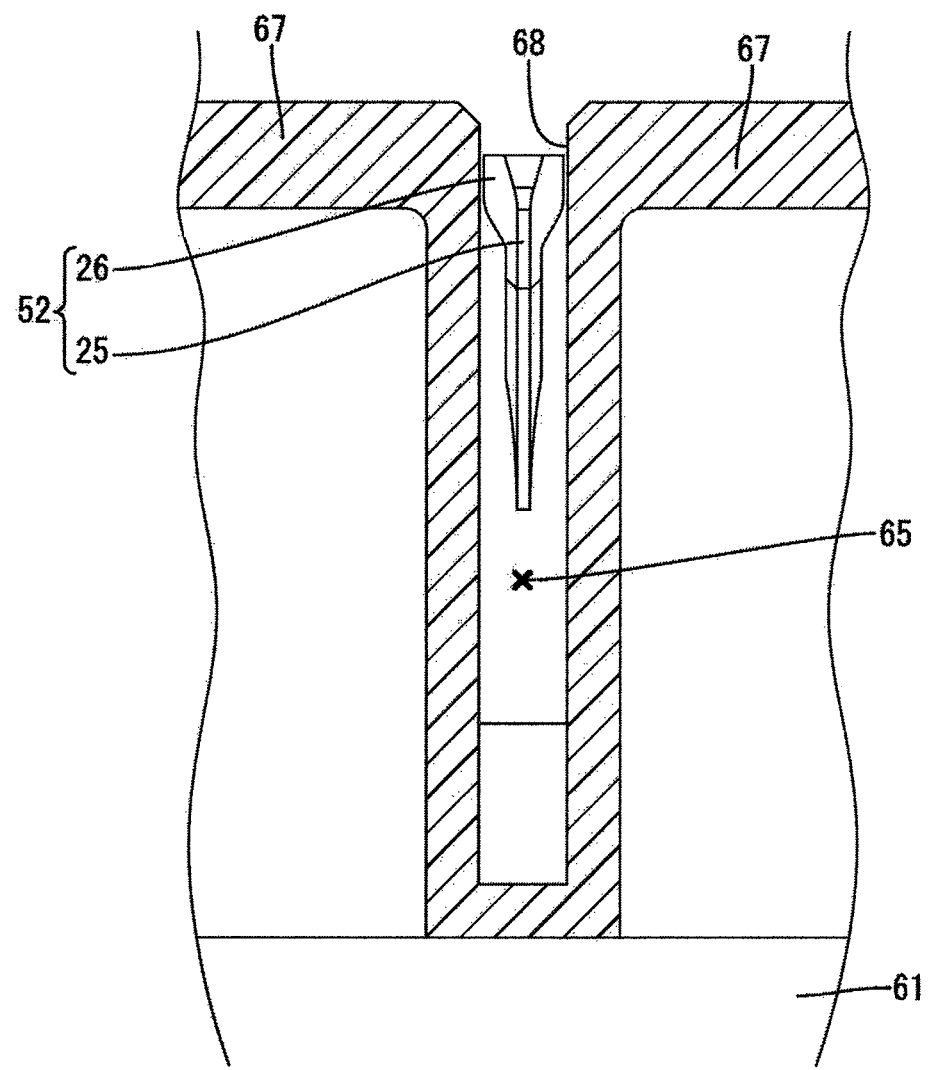
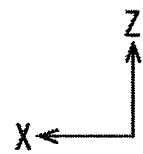

POWER STORAGE MODULE AND CONNECTION MODULE

TECHNICAL FIELD

The present specification relates to a technique to improve the positioning accuracy of a power storage module in which a connection module is attached to a plurality of power storage elements.

BACKGROUND ART

Techniques to match the position of a connection module that is mounted to power storage elements of a power storage module are conventionally known, such as the technique disclosed in JP 2013-33634A, for example. JP 2013-33634A discloses a technique in which an electrode portion for intermediate voltage detection that is provided between a pair of electrode portions (electrode terminals) of a single cell battery (power storage element) serves as a positioned portion, and the positioning portion that fits together with the positioned portion is provided in a battery wiring module (connection module).

JP 2013-33634A is an example of related art.

SUMMARY OF THE INVENTION

Problem to be Solved by the Invention

In the existing technique described above, the positioning portion provided in the connection module is fitted to the positioned portion of the power storage element. Thus, the connection module is positioned with respect to the power storage module, and then a connection member (bus bar) and the power storage element are connected. As a result, the attachability of the connection module can be improved.

However, if there is a large space between the pair of electrode terminals of the power storage element, misalignment from a desired position is prone to occur between a bus bar and the electrode terminal because the distance from the positioning position depends on a positioning configuration in which the electrode portion for intermediate voltage detection serves as the positioned portion. Misalignment between the bus bar and the electrode terminal tends to degrade welding accuracy when laser welding is used to connect the bus bar and the electrode terminal, depending on the amount of misalignment.

The technique disclosed in the present specification has been completed based on circumstances such as those described above, and provides a power storage module and a connection module that can reduce the amount of misalignment of the electrode terminal and the bus bar.

Means to Solve the Problem

The present specification discloses a power storage module having a plurality of power storage elements whose electrode terminals, which include a positive electrode and a negative electrode, are arranged on an electrode arrangement surface; and a connection module that is mounted to the electrode arrangement surface of the plurality of power storage elements, wherein the connection module comprises an insulating protector holding a bus bar, which connects adjacent electrode terminals of the plurality of power storage elements, wherein the insulating protector comprises a plurality of outer walls that intersect a virtual plane that is parallel to the electrode arrangement surface, wherein at least two outer walls that are chosen from the plurality of outer walls are each provided with at least one of a plurality of positioning portions, wherein each of the plurality of positioning portions respectively engages with one of a plurality of positioning engagement portions that are provided on the electrode arrangement surface of the plurality of power storage elements.

Also, the present specification discloses a connection module to be mounted to an electrode arrangement surface of a plurality of power storage elements whose electrode terminals, which include a positive electrode and a negative electrode, are arranged on the electrode arrangement surface, wherein the connection module has an insulating protector holding a bus bar, which connects adjacent electrode terminals of the plurality of power storage elements, wherein the insulating protector comprises a plurality of outer walls that intersect a virtual plane that is parallel to the electrode arrangement surface, in a state in which the insulating protector is mounted to the electrode arrangement surface, wherein at least two outer walls that have been chosen from the plurality of outer walls are each provided with at least one of a plurality of positioning portions, wherein each of the plurality of positioning portions respectively engages with one of a plurality of positioning engagement portions that are provided on the electrode arrangement surface of the plurality of power storage elements.

With this configuration, the positioning portions, which are provided on two outer walls that intersect a virtual plane that is parallel to the electrode arrangement surface, engage with the positioning engagement portions in a direction along the electrode arrangement surface. Thus, it is possible to improve the positioning accuracy between the connection module and the plurality of power storage elements in relation to parallel movements and rotations of the connection module in the virtual plane that is parallel to the electrode arrangement surface. As a result, it is possible to reduce misalignments of the bus bars that are disposed in the connection module and the electrode terminals of the power storage module.

The following configurations are preferred embodiments of the technique disclosed in the present specification.

It is preferable that the two outer walls extend along the alignment direction in which the plurality of power storage elements are aligned, and at least one of the plurality of positioning portions is provided on each of the two outer walls.

With this configuration, it is possible to improve the positioning accuracy between the insulating protector and the plurality of power storage elements, in the alignment direction. Because the plurality of power storage elements are aligned in the alignment direction, it is possible that manufacturing tolerance and assembly tolerance of each individual power storage element accumulate in the alignment direction. For this reason, improving the positioning accuracy between the insulating protector and the plurality of power storage elements in the alignment direction is particularly effective.

It is preferable that, in a state in which the connection module is mounted to the plurality of power storage elements, the plurality of positioning portions are positioned further outward than the electrode terminals, in a direction that intersects the alignment direction.

With this configuration, it is possible to widen the space between the plurality of positioning portions. Thus, it is possible to improve the positioning accuracy between the connection module and the plurality of power storage elements with respect to rotations with a direction that is perpendicular to the electrode arrangement surface serving as the rotation axis.

The plurality of positioning engagement portions are preferably provided on one power storage element of the plurality of power storage elements, or, are preferably provided in two adjacent power storage elements of the plurality of power storage elements.

With this configuration, it is possible to position the insulating protector with at least one of the power storage elements of the plurality of power storage elements as a reference, or, to position the insulating protector with two adjacent power storage elements as the reference. Manufacturing tolerance is included in the positioning accuracy of the positioning engagement portion provided on the power storage elements. If there are three or more power storage elements, the manufacturing tolerance of the positioning accuracy of the positioning engagement portion adds up. For this reason, it is possible to suppress the degradation of the positioning accuracy of the insulating protector by positioning the insulating protector with at least one of the power storage elements of the plurality of power storage elements as the reference, or by positioning the insulating protector with two adjacent power storage elements as the reference.

It is preferable that the plurality of positioning portions are protruding portions that protrude outwards from the two outer walls of the insulating protector, the plurality of positioning engagement portions are extending portions that extend in a direction perpendicular to the electrode arrangement surface, and the extending portions have a recessed portion into which the protruding portions are fitted.

With this configuration, it is possible to position an insulating protector with a simple operation of fitting the protruding portion into the recessed portion.

It is preferable that the insulating protectors are linked by the linking portions of a plurality of linking units, and a pair of positioning engagement portions are provided on at least one of the linking units of the plurality of linking units.

With this configuration, it is possible to improve positioning accuracy of the entire insulating protector because it is possible to individually position each insulating protector with the plurality of linking units that constitute the insulating protector.

Effect of the Invention

According to the technique disclosed in the present specification, even if there is a large space between pairs of electrode terminals of the power storage element, it is possible to reduce the amount of misalignment of the electrode terminal and the bus bar.

BRIEF DESCRIPTION OF THE DRAWINGS

FIG. 7 is a sectional view taken along line VII-VII of FIG. 6.

EMBODIMENTS OF THE INVENTION

First Embodiment

Figure 1:
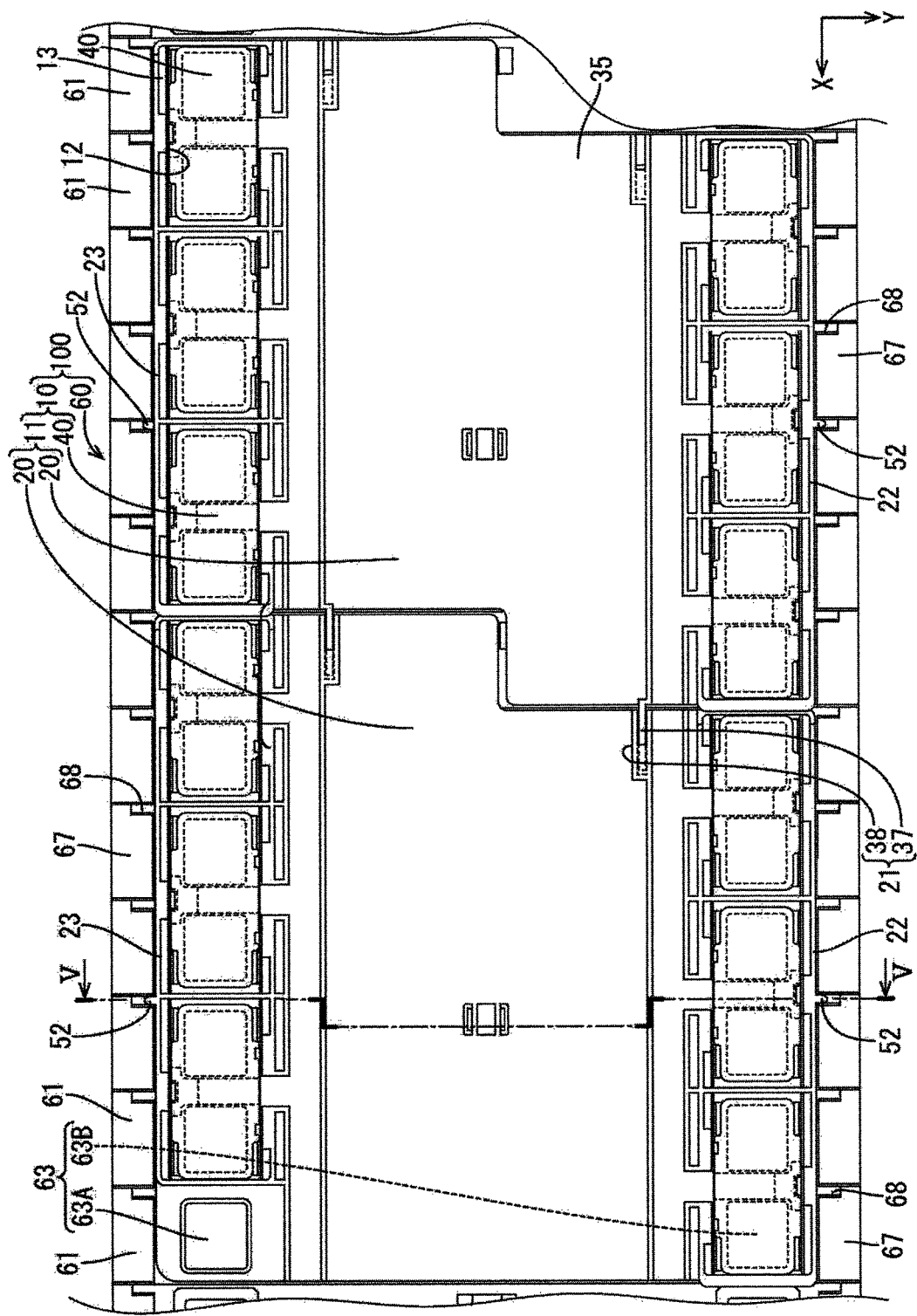
FIG. 1 is a plan view showing the power storage module according to a first embodiment.

The following describes an embodiment with reference to FIGS. 1 to 8 in which the technique disclosed in the present specification is applied to a power storage module 100. The power storage module 100 of the present embodiment is, for example, installed in a vehicle such as an electric automobile or a hybrid automobile (not shown) and used as a power source for driving the vehicle.

Note that in the following description, the Z direction is upward, the Y direction is forward, and the X direction is leftward. Also, a plurality of the same members have a reference numeral attached to one member and the reference numerals of the other members may be omitted.

Figure 4:
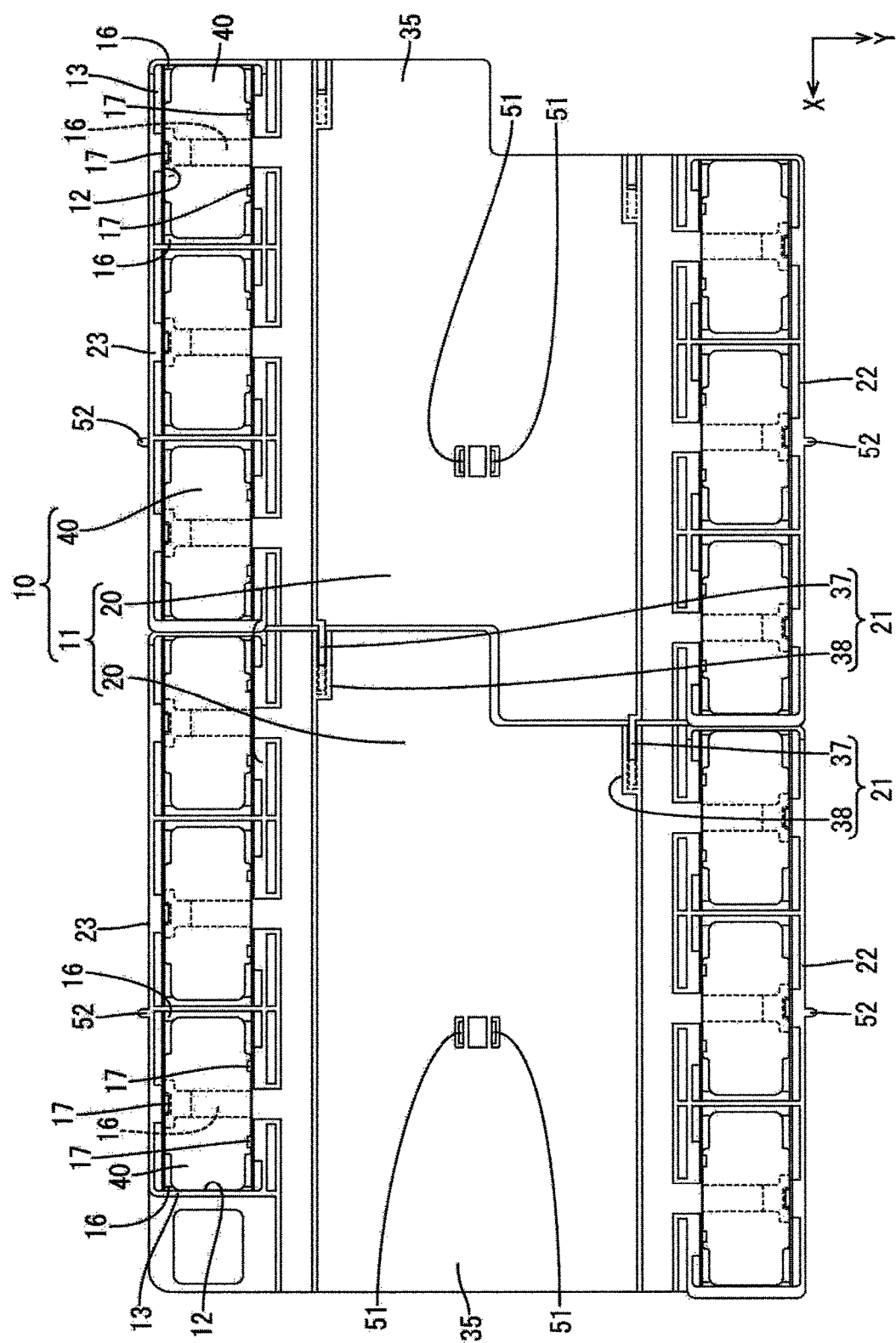
FIG. 4 is a plan view showing the connection module.
Figure 5:
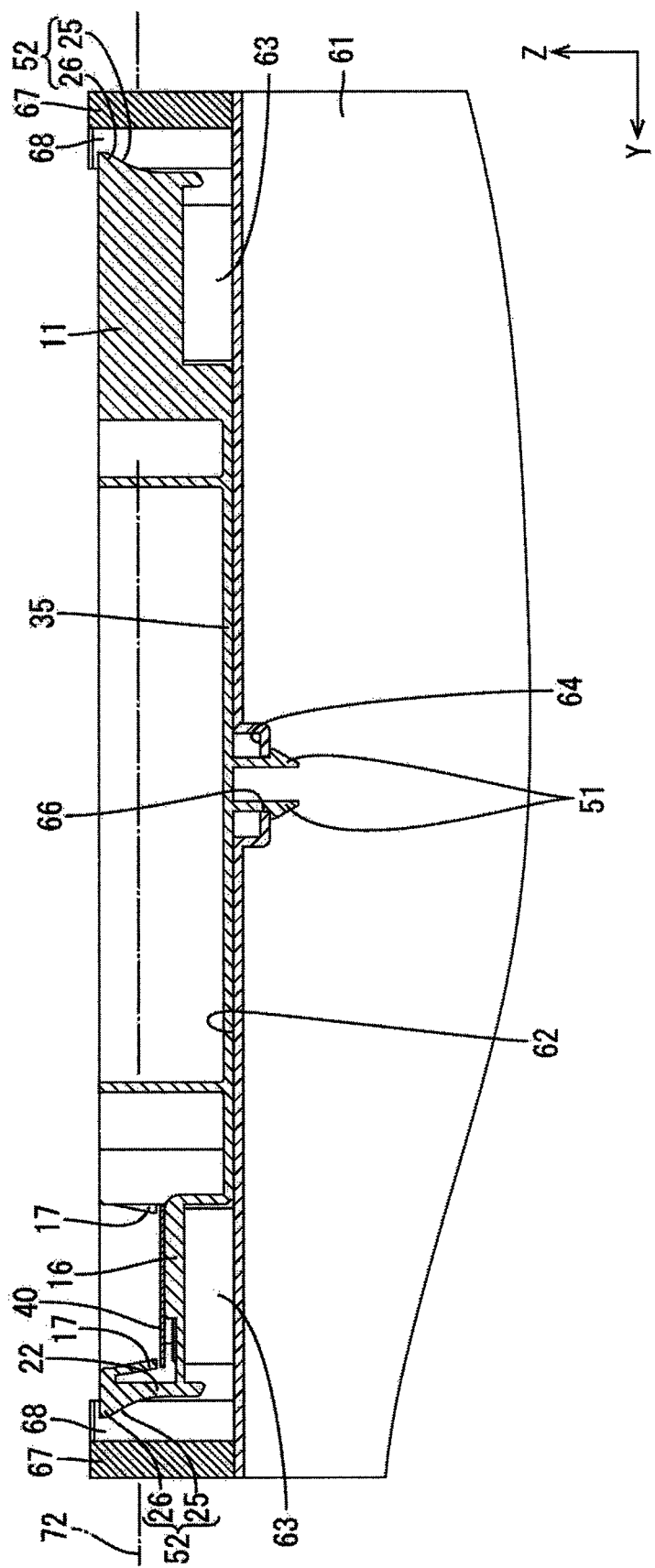
FIG. 5 is a diagram of a sectional view taken along line V-V of FIG. 1.

The power storage module 100 of the present embodiment, as shown in FIG. 1 and FIG. 5, mainly includes a power storage element group 60 in which a plurality of power storage elements 61 are aligned (see FIG. 2), and a connection module 10 that is attached to the power storage element group 60 (see FIG. 4).

Figure 2:
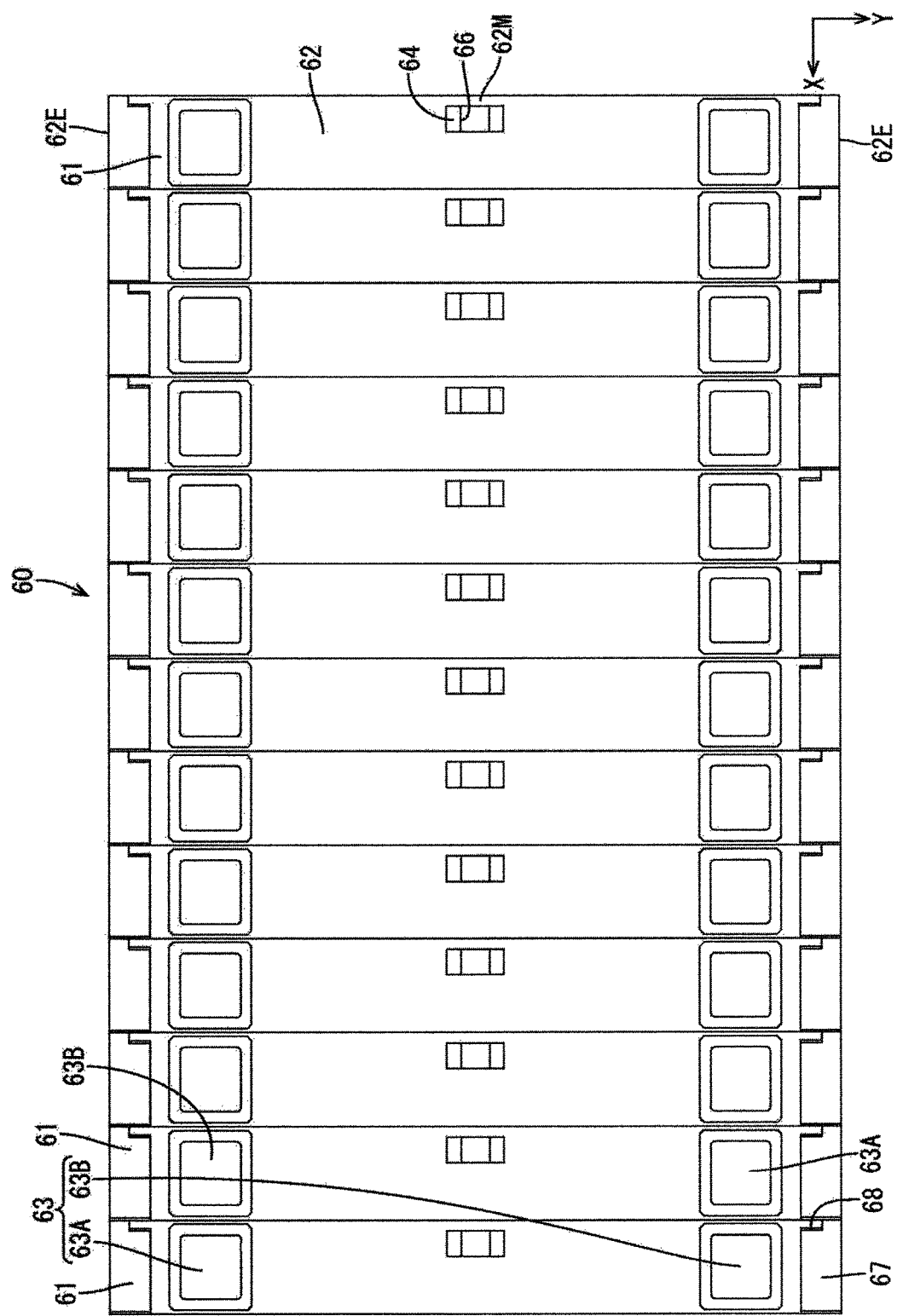
FIG. 2 is a plan view showing a group of power storage elements.

As shown in FIG. 2, the power storage elements 61 of the present embodiment, have a plurality of power storage elements 61 that are aligned in a row in the left-right direction (an example of the alignment direction), constituting the power storage element group 60.

Figure 3:
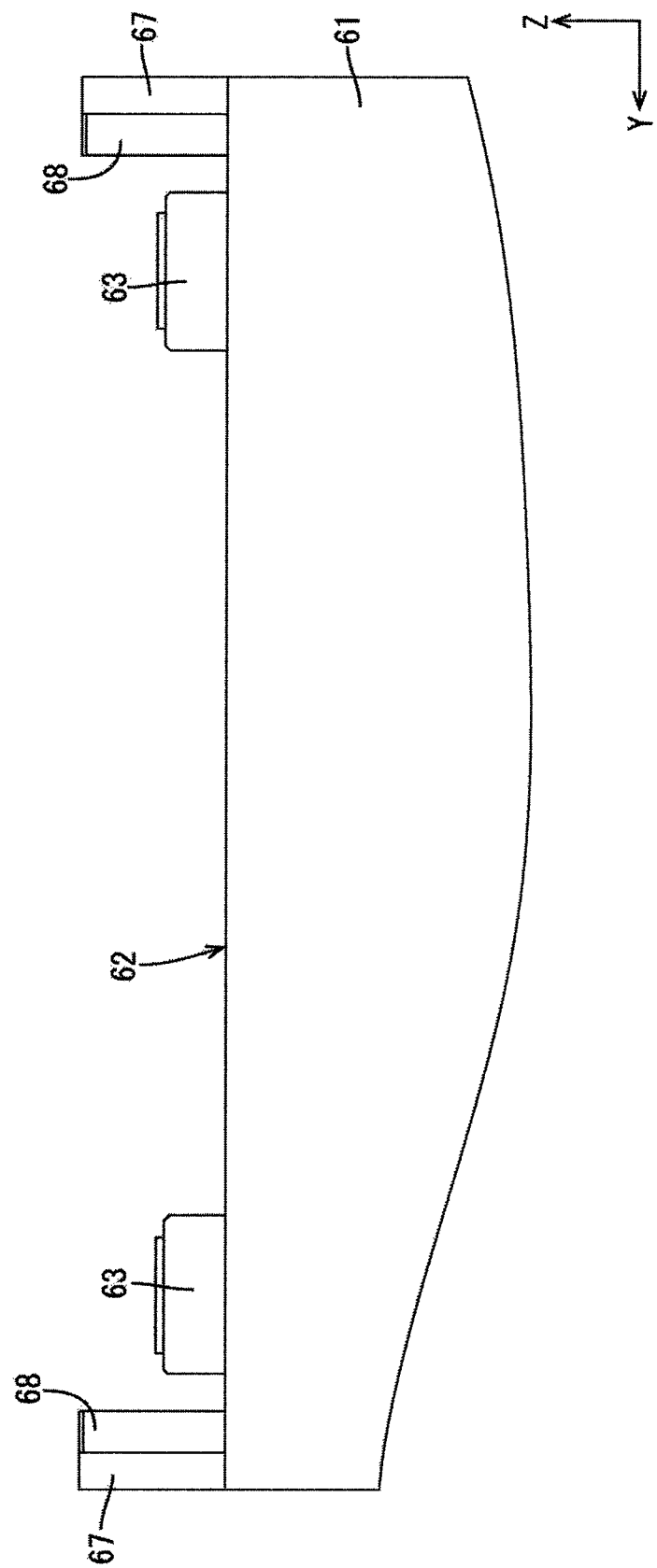
FIG. 3 is a partially enlarged side view showing a power storage element.

The power storage elements 61 have a flat rectangular parallelepiped shape and, as shown in FIG. 2 and FIG. 3, have an electrode arrangement surface 62 that is perpendicular to the plane in which adjacent power storage element 61 face each other. A pair of electrode terminals 63 are arranged on the electrode arrangement surface 62 in positions toward both end portions (62E and 62E) in the front-rear direction. One of the electrode terminals 63 is a positive electrode terminal 63A and the other is a negative electrode terminal 63B. The electrode terminals 63 are made of a metal, and protrude in a rectangular tube shape from the electrode arrangement surface 62 (see FIG. 2 and FIG. 3).

A locking hole 66 into which locking hooks 51 of an insulating protector 11 fit, which will be described later, is provided in a central portion 62M between the pair of electrode terminals 63, on the electrode arrangement surface 62 of the power storage elements 61. The locking hole 66 has a rectangular opening and is opened on the bottom portion of a step portion 64 that is recessed as a concavity in the shape of the letter "U" in the electrode arrangement surface 62 (see FIG. 5 and FIG. 8). The locking hooks 51 engage the hole edge portion of the locking hole 66 from below (from the power storage element 61 side) and hold the insulating protector 11 in the up-down direction (the direction away from the power storage element 61) in a retained state.

Also, a rectangular parallelepiped-shaped extending portion 67 (an example of a positioning engagement portion), that has a recessed portion 68 into which a protruding portion 52 (an example of a positioning portion) of the insulating protector 11 engages, is arranged on end portions 62E of the electrode arrangement surface 62 of each power storage element 61. The recessed portion 68 extends in a direction perpendicular to the electrode arrangement surface 62 (the up-down direction in FIG. 3).

As shown in FIG. 2, the recessed portion 68 is formed by cutting out a part of the right edge of the extending portion 67. Through this, a groove-shaped gap 65 is formed that extends in a direction that is perpendicular to the electrode arrangement surface 62 between the recessed portion 68 that is formed in one of the extending portions 67 and an outer surface of another extending portion 67 adjacent thereto (see FIG. 6). The protruding portion 52 engages from above with the gap 65.

The plurality of power storage elements 61 are aligned such that electrode terminals 63 of different polarities are adjacent to each other in two adjacent power storage elements 61 (in other words, the positive electrode terminal 63A of one power storage element 61 is mutually adjacent to the negative electrode terminal 63B of another power storage element 61 that is directly adjoined with it).

As shown in FIG. 4, the connection module 10 is a member that is assembled on a surface of the power storage element group 60, that is constituted by the electrode arrangement surfaces 62 of the power storage elements 61. The connection module 10 includes the insulating protector 11 and bus bars 40 that are held by the insulating protector 11 and connect the positive electrode terminals 63A and the negative electrode terminals 63B of adjacent power storage elements 61.

The bus bars 40 are made by punching a metal plate, and as shown in FIG. 4, are approximately rectangular plate-shaped members, in which the corners of the flat rectangular plates are removed to create approximately rectangular plate-shaped members. The material of the bus bars 40 may be, for example, copper, a copper alloy, aluminum, an aluminum alloy, stainless steel (SUS), or the like.

The insulating protector 11 according to the present embodiment is mounted to a surface that is constituted by the electrode arrangement surfaces 62 of the plurality of power storage elements 61. The insulating protector 11 has a plurality (two in the present embodiment) of linking units 20. The two linking units 20 are aligned along the alignment direction (the left-right direction) of the plurality of power storage elements 61. The linking units 20 are constituted by insulating members made of a synthetic resin or the like. As shown in FIG. 4, the linking units 20 each have a pair of bus bar holding portions 12 that house and hold the bus bar 40 and have openings in the up-down direction.

Each bus bar holding portion 12 has a rectangular tube-shaped housing wall 13 that holds the bus bars 40 inside of the bus bar holding portion 12 in a state of insulation to any adjacent bus bar 40. The bus bar holding portion 12 has placement portions 16 that are formed in the center portion and both side portions in the lengthwise direction, and a plurality of stopper pieces 17 that are formed in both end portions in the widthwise direction (see FIG. 4).

Also, the bus bar holding portions 12 that are provided on the front end of the linking unit 20, and the bus bar holding portions 12 that are provided on the rear end of the linking unit 20 are linked by a plate-shaped linking plate portion 35.

The linking plate portions 35 are provided with linking portions 21 to link the adjacent linking units 20 together. The linking portions 21 are made up of an engaging portion 37 that is provided on one of the adjacent linking units 20, and an engagement receiving portion 38 that is provided on the other of the adjacent linking units 20, and engages with the engaging portion 37.

Figure 8:
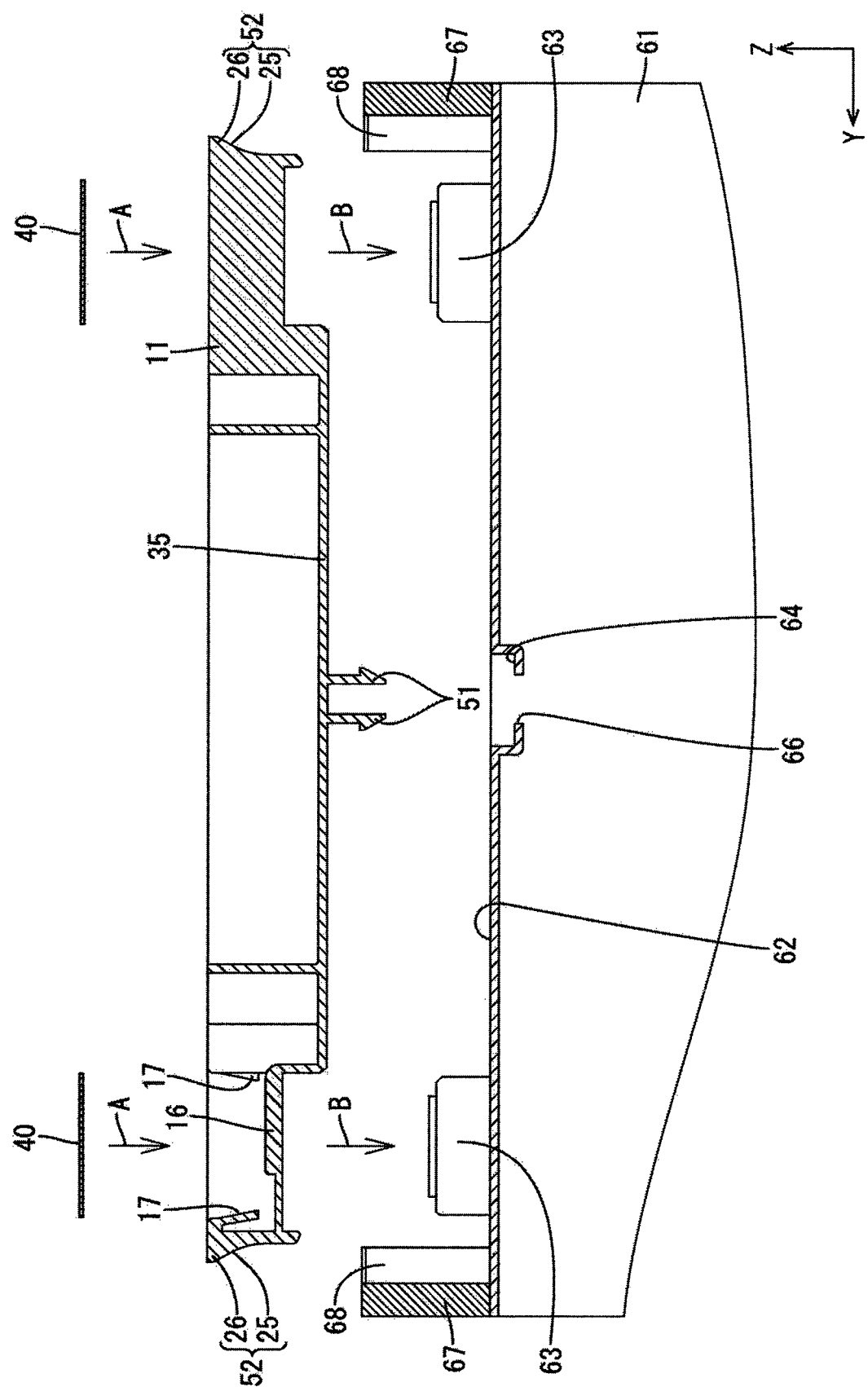
FIG. 8 is a partial sectional view showing the corresponding fit of the bus bar, the insulating protector and the power storage element.

The linking plate portions 35 of the linking units 20 are provided with the locking hooks 51 that fit into the locking holes 66 that are provided in the central portion 62M of the electrode arrangement surface 62 of the power storage element 61 (see FIG. 5 and FIG. 8). Also, the connection protectors are provided with the protruding portions 52 that fit into the extending portions 67 that are provided on one end portion 62E of the electrode arrangement surface 62 of the power storage element 61, or more specifically, that fit into the recessed portions 68 of the extending portions 67, the protruding portions 52 protruding outward from the outer side of the bus bar holding portions 12 (see FIG. 1 and FIG. 4). The locking hooks 51 and the extending portions 67 described above are provided with respect to the same power storage elements 61.

The linking units 20 have a front wall 22 and a rear wall 23 that intersect a virtual plane 72 that is parallel to the electrode arrangement surface 62 (see FIG. 5). In other words, the linking units 20 have the front wall 22 positioned on the front end portion side (an example of an outer wall), and have the rear wall 23 that is positioned on the rear end portion side (an example of an outer wall). At least one of the protruding portions 52 described above is formed on the front wall 22 and protrudes forward. Also, at least one of the protruding portions 52 described above is formed on the rear wall 23 and protrudes rearward. Thus, a pair of protruding portions 52 is provided on the linking unit 20.

The bus bar holding portions 12 that hold the bus bars 40 are provided on the insulating protector 11 between the pair of protruding portions 52 in the front-rear direction.

As shown in FIG. 5, each protruding portion 52 is roughly plate-shaped and extends in the front-rear direction. A slanted guide surface 25 that is slanted outward in the front-rear direction is formed on the edge portion on the power storage element 61 side of the protruding portion 52, the slanted guide surface 25 protruding further outward, the more it is removed from the end portion on the power storage element 61 side. In other words, the slanted guide surface 25 that is provided on the bottom surface of the protruding portion 52 slants inward in the front-rear direction, when following the slanted guide surface 25 in a downward direction.

As shown in FIG. 7, the edge of the protruding portion 52 on the side opposite to the power storage element 61 is a thick-walled portion 26 that is formed to be rather thick. The thickness of the thick-walled portion 26 in the left-right direction is the same as, or slightly smaller than, the width of the recessed portion 68 in the left-right direction.

The following describes a process of assembling the power storage module 100. The process of assembling the power storage module 100 is not limited to the following description.

When the power storage module 100 of the present embodiment described above is assembled, first, two linking units 20 are linked together by the engaging portions 37 and engagement receptacle portions 38.

Next, as shown in FIG. 8, the bus bars 40 are housed in the bus bar holding portions 12 of the linking units 20 from the direction shown by arrows A. The bus bars 40 are pushed downward while being guided by the housing wall 13 of the bus bar holding portions 12, abut the stopper pieces 17, the stopper pieces 17 elastically deform in the downward direction and the bus bars continue further downward. Then, the bus bars are pushed until they pass these stopper pieces 17, then the stopper pieces 17 elastically restore and the bus bars are held in a locked state, pushed down from above (see FIG. 5).

Both side portions, in the longitudinal direction, and the center portion of the bus bars 40, which are housed in the bus bar holding portion 12, are placed on the placement portion 16, so that the bus bars 40 are supported from below. In this state, the welded parts of the lower surface (bottom surface) of the bus bars 40 are exposed facing downward.

The connection module 10 that is assembled in this way is attached to the electrode arrangement surface 62 of the power storage element group 60. Specifically, as shown in FIG. 8, the locking hooks 51 of the insulating protectors 11 are inserted into the locking holes 66 of the power storage elements 61 from above (the direction shown by arrows B), and the protruding portions 52 of the linking units 20 are inserted (fitted) into the recessed portions 68 of the power storage element 61 from above.

As the insulating protector 11 comes close to the power storage element group 60, the locking hooks 51 elastically deform and run over the hole edge portion of the locking holes 66. Furthermore, when the insulating protector 11 comes close to the power storage element group 60, the locking hooks 51 elastically restore and abut the hole edge portion of the locking hole 66 from below. Though this, the insulating protector 1 is held to the power storage element group 60 in a locked state from above.

On the other hand, the protruding portions 52 are inserted into the recessed portions 68 from above. When the insulating protector 11 comes close to the power storage element group 60, the protruding portions 52 are firmly inserted into the recessed portions 68 through the opening edge portions of the recessed portions 68 sliding against the slanted guide surfaces 25 of the protruding portions 52. Furthermore, when the insulating protector 11 comes close to the power storage element group 60, the thick-walled portion 26 of the protruding portions 52 is inserted into the recessed portion 68.

Figure 6:
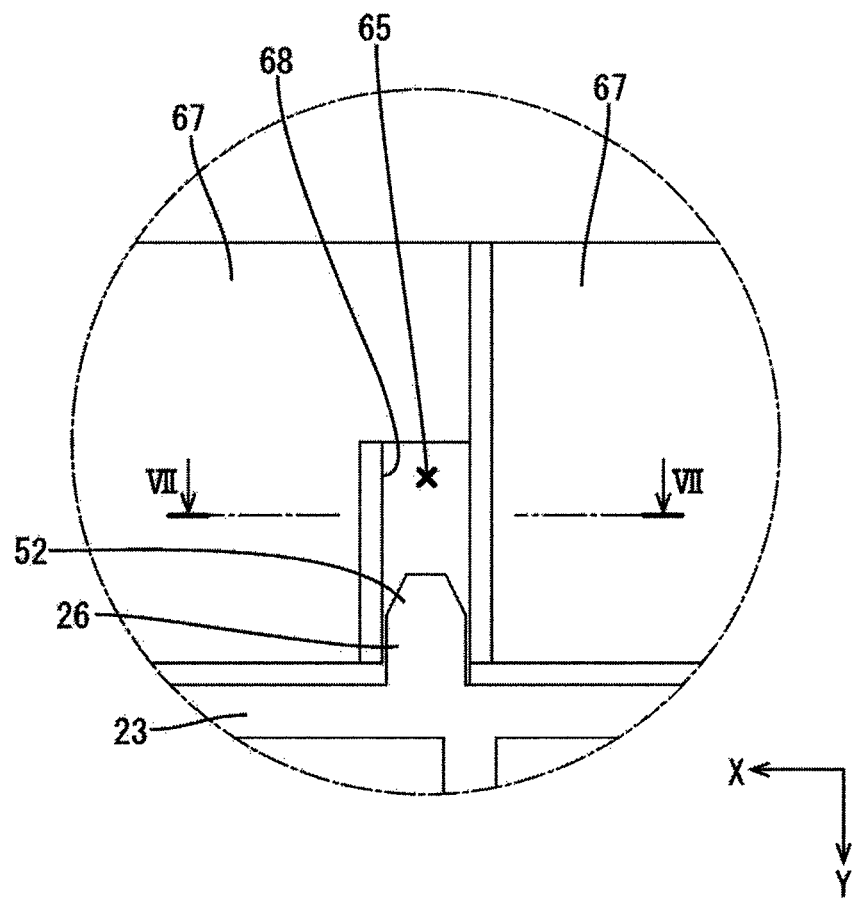
FIG. 6 is partially enlarged-plan diagram showing a state in which the protruding portion is disposed in a space between the recessed portion and the extending portion.

As shown in FIG. 6, both the left and right sides of each protruding portion 52 abut against the side surface of one extending portion 67 and the side surfaces of another extending portion 67 (the side surface of the recessed portion 68), which constitute the gap 65. Through this, the insulating protector 11 is positioned in the left-right direction. Furthermore, similar to the description above, the insulating protector 11 is also positioned in the left-right direction by the protruding portion 52 shown in FIG. 6 and the protruding portion 52 positioned on the opposite side in the front-rear direction. Thus, the insulating protector 11 is positioned in the left-right direction with respect to the front wall 22 and the rear wall 23 that extend along the left-right direction. As a result of this, the insulating protector 11 is positioned in the left-right direction in a plane parallel to the electrode arrangement surface 62.

Also, if the insulating protector 11 is positioned by the protruding portion 52 of the front wall 22 and the protruding portion 52 of the rear wall 23 with respect to a direction that is different from the left-right direction, as in a case where the protruding portion 52 at the front wall 22 abuts the extending portion 67 from the left and the protruding portion 52 of the rear wall 23 abuts the extending portion 67 from the right, the insulating protector 11, which is in a plane parallel to the electrode arrangement surface 62, is positioned with respect to rotations with the up-down direction (the direction that is orthogonal to the electrode arrangement surface 62) as the rotation axis.

In a state in which the insulating protector 11 is positioned on the power storage element group 60, the front end portion (upper surface) of the electrode terminals 63 abuts the bottom surface of the bus bars 40 that are exposed downward (see FIG. 5). In this state, a laser irradiation apparatus (not shown) that is disposed above the connection module 10 irradiates laser light onto predetermined positions of the bus bars 40 and welds the bus bars 40 and the electrode terminals 63 together through laser welding. Thus, the power storage module 100 is complete (see FIG. 1).

The following describes the operation and effect of the present embodiment. In accordance with the present embodiment, a power storage module 100 includes a plurality of power storage elements 61 whose electrode terminals 63, which include a positive electrode 63A and a negative electrode 63B, are arranged on an electrode arrangement surface 62; and a connection module 10 that is mounted to the electrode arrangement surface 62 of the plurality of power storage elements 61, wherein the connection module 10 comprises an insulating protector 11 holding a bus bar 40, which connects adjacent electrode terminals 63 of the plurality of power storage elements 61, wherein the insulating protector 11 comprises a front wall 22 and a rear wall 23 that intersect a virtual plane 72 that is parallel to the electrode arrangement surface, wherein the front wall 22 and the rear wall 23 are each provided with at least one of a plurality of protruding portions 52, and wherein the protruding portions 52 that are respectively provided on the front wall 22 and the rear wall 23 respectively engage with one of a plurality of extending portions 67 that are provided on the electrode arrangement surface 62 of the plurality of power storage elements 61.

Also, in accordance with the present embodiment, a connection module 10 is provided that is to be mounted to an electrode arrangement surface 62 of a plurality of power storage elements 61 whose electrode terminals 63, which include a positive electrode 63A and a negative electrode 63B, are arranged on the electrode arrangement surface 62, wherein the connection module 10 has an insulating protector 11 holding a bus bar 40, which connects adjacent electrode terminals 63 of the plurality of power storage elements 61, wherein the insulating protector 11 comprises a front wall 22 and a rear wall 23 that intersect a virtual plane 72 that is parallel to the electrode arrangement surface 62, in a state in which the insulating protector 11 is mounted to the electrode arrangement surface 62, wherein the front wall 22 and the rear wall 23 are each provided with at least one of a plurality of protruding portions 52, wherein each of the plurality of protruding portions 52 at the front wall 22 and the rear wall 23 respectively engages with one of a plurality of extending portions 67 that are provided on the electrode arrangement surface 62 of the plurality of power storage elements 61.

With this configuration, the protruding portions 52 that are respectively provided on the front wall 22 and the rear wall 23 intersect with the virtual plane 72 that is parallel to the electrode arrangement surface 62 and engage with the extending portions 67 in the direction along the electrode arrangement surface 62. Thus, it is possible to improve the positioning accuracy between the connection module 10 and the plurality of power storage elements 61 for parallel movement and rotation of the connection module 10 in the virtual plane 72 that is parallel to the electrode arrangement surface 62. As a result, it is possible to reduce misalignment of the bus bars 40 that are disposed in the connection module 10 and the electrode terminals 63 of the power storage module 61.

The following describes this in more detail. Both the left and right side portions of the protruding portions 52 abut the side surface of one extending portion 67 and the side surface of the other extending portion 67 (i.e. the side surfaces of the recessed portion 68), which constitute the gap 65. Through this, the insulating protector 11 is positioned in the left-right direction. Furthermore, similar to this, the insulating protector 11 is also positioned in the left-right direction by the protruding portion 52 shown in FIG. 6 and the protruding portion 52 positioned in the opposite side of the front-rear direction. Thus, the insulating protector 11 is positioned in the left-right direction with respect to the front wall 22 and the rear wall 23 that extend along the left-right direction. As a result of this, the insulating protector 11 is positioned in the left-right direction within a plane that is parallel to the electrode arrangement surface 62.

Also, if the insulating protector 11 is positioned by the protruding portion 52 of the front wall 22 and the protruding portion 52 of the rear wall 23 in a direction that is different from the left-right direction, as in a case where the protruding portion 52 of the front wall 22 abuts the extending portion 67 from the left and the protruding portion 52 of the rear wall 23 abuts the extending portion 67 from the right, the insulating protector 11, which is in a plane parallel to the electrode arrangement surface 62, is positioned with respect to rotations in the up-down direction (the direction that is perpendicular to the electrode arrangement surface 62) as the rotation axis.

According to the present embodiment, the front wall 22 and the rear wall 23 extend along an alignment direction in which the plurality of power storage elements 61 are aligned, and each of the front wall 22 and the rear wall 23 is provided with a protruding portion 52.

With this configuration, it is possible to improve the positioning accuracy between the insulating protector 11 and the plurality of power storage elements 61 in the alignment direction. Because the plurality of power storage elements 61 are aligned in the alignment direction, it is possible that the manufacturing tolerance and assembly tolerance of the individual power storage elements 61 accumulates in the alignment direction. For this reason, improving the positioning accuracy between the insulating protector 11 and the plurality of power storage elements 61 in the alignment direction is particularly effective.

According to the present embodiment, in a state in which the connection module 10 is mounted to the plurality of power storage elements 61, the plurality of protruding portions 52 are positioned further outward than the electrode terminal 63 is in the front-rear direction (a direction that intersects the alignment direction).

With this configuration, it is possible to widen the space between the plurality of positioning portions. Thus, it is possible to improve the positioning accuracy between the connection module 10 and the plurality of power storage elements 61 with respect to rotations of the insulating protector 11 about the vertical axis (which extends in a direction perpendicular to the electrode arrangement surface as an axis).

According to the present embodiment, the plurality of protruding portions 52 are provided on one power storage element 61 of the plurality of power storage elements 61.

With this configuration, it is possible to position the insulating protector with at least one of the power storage elements 61 of the plurality of power storage elements as the reference. The position accuracy of the extending portion 67 that is provided on the power storage element 61 is subject to manufacturing tolerance (manufacturing errors). If there are three or more power storage elements 61, then this adds to the manufacturing tolerance (errors) in the positioning accuracy of the extending portion 67. For this reason, positioning the insulating protector 11 with at least one of the plurality of power storage elements 61 as the reference, or, positioning the insulating protector 11 with two adjacent power storage elements 61 as the reference can suppress the degradation of the positioning accuracy of the insulating protector 11.

According to the present embodiment, the plurality of protruding portions 52 protrude outwards from the front wall 22 and the rear wall 23 of the insulating protector 11, and the plurality of extending portions 67 extend in a direction that is perpendicular to the electrode arrangement surface 62, and the extending portions 67 have a recessed portion 68 into which the protruding portion 52 is fitted.

With this configuration, it is possible to position the insulating protector 11 with a simple operation of fitting the protruding portions 52 into the recessed portions 68.

According to the present embodiment, the insulating protector 11 has a plurality of linking units 20 that are linked by a linking portion 21, and the plurality of protruding portions 52 is provided on at least one of the plurality of linking units 20.

With this configuration, it is possible to improve positioning accuracy of the entire insulating protector 11 because the plurality of linking units 20 that constitute the insulating protector 11 can be positioned individually.

Other Embodiments

The technique disclosed in the present specification is not limited to the embodiment described above with reference to the drawings, and includes the technical scope of the embodiments as follows.

(1) The embodiment described above is configured such that protruding portions 52 are provided on the front wall 22 and the rear wall 23 respectively, but the present invention is not limited to this, and the insulating protector 11 may also be provided with a left wall and right wall that intersect the virtual plane 72, and the protruding portions may be provided on the left wall and the right wall of these. The invention may also be configured such that protruding portions are provided on the front wall and the left wall, may be configured such that protruding portions are provided on the rear wall and right wall, and can be configured such that protruding portions are provided on two different outer walls respectively, of a plurality of outer walls that intersect the virtual plane 72.

(2) The embodiments described above show an example in which a pair of protruding portions 52 of the insulating protector 11 are respectively provided in positions that correspond to a pair of extending portions 67 that are provided on the same power storage element 61 of six (more than two) power storage elements 61, but the present invention is not limited to this. For example, a configuration is also possible in which the power storage element 61 that is provided with the extending portion 67 into which one protruding portion 52 of the pair of protruding portions 52 fits, and the power storage element 61 that is provided with an extending portion 67 into which the other protruding portion 52 fits, are arranged to be adjacent.

(3) The embodiments described above show an example in which each power storage element 61 is provided with an extending portion 67, but the present invention is not limited to this. For example, a configuration is also possible in which only those power storage elements 61 in positions on the insulating protector 11 that correspond to the protruding portions 52 are provided with an extending portion 67.

(4) The embodiments described above show an example in which the positioning engagement portions are constituted by the extending portions 67 that have the recessed portions 68 and the positioning portions are constituted by the protruding portions 52 that fit into the recessed portions 68, but the configuration of the positioned portions and the positioning portions is not limited to this. For example, a reverse configuration is also possible, that is, the positioning portions may be constituted by the extending portions that have the recessed portions, and the positioning engagement portions may be constituted by the protruding portions.

(5) The embodiment above is configured such that the protruding portion 52 is arranged in the gap 65 between the recessed portion 68 formed in an extending portion 67 and the outer surface of the extending portion 67 that is positioned next to this extending portion 67, but the present invention is not limited to this, and a configuration is also possible in which a groove portion is formed extending perpendicular to the electrode arrangement surface 62 in one extending portion 67, and the protruding portion 52 is arranged inside the groove portion.

(6) The embodiments above show an example of a configuration in which two linking units 20 link the connection module 10, but the number of linking units 20 that are linked is not limited to this. For example, the connection module 10 may be constituted by an insulating protector 11 made of a single linking unit 20, or may be constituted by an insulating protector 11 in which three or more linking units 20 are linked together. Also, the number of bus bar holding portions 12 included in one linking unit 20 is not limited to two. For example, one linking unit 20 may also include four bus bar holding portions 12.

(7) The embodiments above show an example in which the bus bars 40 and the electrode terminals 63 are laser welded, but the technique disclosed in the present specification can also be applied to a connection module in which they are connected with nuts and bolts.

(8) The power storage element 61 according to embodiments above may be a secondary battery or a capacitor.

LIST OF REFERENCE NUMERALS

- 10: Connection module
- 11: Insulating protector
- 12: Bus bar holding portion
- 20: Linking unit
- 22: Front wall (an example of an outer wall)
- 23: Rear wall (an example of an outer wall)
- 24: Guiding protruding portion
- 25: Slanted guide surface
- 26: Thick-walled portion
- 40: Bus bar
- 51: Locking protruding portion
- 52: Protruding portion (an example of a positioning portion)
- 61: Power storage element
- 62: Electrode arrangement surface
- 63: Electrode terminal
- 63A: Positive electrode terminal
- 63B: Negative electrode terminal
- 66: Locking hole
- 67: Extending portion (an example of a positioning engagement portion)
- 68: Recessed portion
- 72: Virtual plane
- 100: Power storage module

What is claimed is:

1. A power storage module comprising:
    a plurality of power storage elements including electrode terminals, including a positive electrode and a negative electrode, arranged on an electrode arrangement surface; and
    a connection module that is mounted to the electrode arrangement surface of the plurality of power storage elements,
    wherein the connection module comprises an insulating protector holding a bus bar, which connects adjacent electrode terminals of the plurality of power storage elements,
    wherein the insulating protector comprises a plurality of outer walls that intersect a virtual plane that is parallel to the electrode arrangement surface, the insulating protector being provided with an elastically deformable locking claw that locks with an edge of a locking hole provided on the electrode arrangement surface and attaches the insulating protector to the plurality of power storage elements,
    wherein at least two of the outer walls extend along an arrangement direction in which the plurality of power storage elements are aligned at an end portion of the insulating protector, and the two outer walls are each provided with at least one of a plurality of positioning projections, and
    wherein when the locking hole and the locking claw are fitted and the insulating protector is attached to the plurality of power storage elements, at least one of the plurality of positioning projections provided on the two outer walls is positioned further outward than the electrode terminals in a direction that intersects the arrangement direction, and is disposed in a region where the locking claw is provided, and each of the plurality of positioning projections respectively engages with one of a plurality of positioning engagement receptacles that are provided on the electrode arrangement surface of the plurality of power storage elements.

2. The power storage module according to claim 1, wherein, when the connection module is mounted to the plurality of power storage elements, the plurality of positioning projections are positioned further outward than the electrode terminals in the direction that intersects the arrangement direction.

3. The power storage module according to claim 1, wherein one power storage element of the plurality of power storage elements is provided with the plurality of positioning engagement receptacles, or
    two adjacent power storage elements of the plurality of power storage elements are provided with the plurality of positioning engagement receptacles.

4. The power storage module according to claim 1, wherein the insulating protector includes a plurality of linking housings that are linked by a linking fitting, and the plurality of positioning projections are provided on at least one of the plurality of linking housings.

5. The power storage module according to claim 1, wherein the plurality of positioning engagement receptacles extend to a position away from the electrode terminals in a direction perpendicular to the electrode arrangement surface so as to be fitted to the plurality of positioning projections, and
    when the plurality of positioning engagement receptacles are fitted with the plurality of positioning projections, each of the plurality of positioning engagement receptacles completely covers a side portion of a respective one of the plurality of positioning projections.

6. The power storage module according to claim 1, wherein the plurality of positioning projections protrude outwards from two of the outer walls of the insulating protector, and the plurality of positioning engagement receptacles extend in a direction perpendicular to the electrode arrangement surface, wherein the plurality of positioning engagement receptacles each include a recess into which a respective one of the plurality of positioning projections is are fitted.

7. The power storage module according to claim 6, wherein an edge of each of the plurality of positioning projections on a side opposite to an electrode arrangement surface side of the power storage elements includes a thick-walled portion that is formed to be thicker than an end portion of a power storage element side of a respective one of the plurality of positioning projections.

8. A connection module configured to be mounted to an electrode arrangement surface of a plurality of power storage elements including electrode terminals, including a positive electrode and a negative electrode, arranged on the electrode arrangement surface, the connection module comprising:

an insulating protector holding a bus bar, which connects adjacent electrode terminals of the plurality of power storage elements, wherein the insulating protector comprises a plurality of outer walls that intersect a virtual plane that is parallel to the electrode arrangement surface, when the insulating protector is mounted to the electrode arrangement surface, the insulating protector being provided with a locking claw that locks with a locking hole provided on the electrode arrangement surface and attaches the connection module to the plurality of power storage elements, wherein at least two of the outer walls extend along an arrangement direction in which the plurality of power storage elements are aligned, and the two outer walls are each provided with at least one of a plurality of positioning projections, and wherein when the locking hole and the locking claw are fitted and the connection module is attached to the plurality of power storage elements, at least one of the plurality of positioning projections provided on the two outer walls is positioned further outward than the electrode terminals in a direction that intersects the arrangement direction, and is disposed in a region where the locking claw is provided, and each of the plurality of positioning projections respectively engages with one of a plurality of positioning engagement receptacles that are provided on the electrode arrangement surface of the plurality of power storage elements.

9. The connection module according to claim 8, wherein the insulating protector includes a plate structure that is disposed parallel to the virtual plane when the insulating protector is mounted to the electrode arrangement surface, and the plate structure includes at least one of the locking claw that engages with at least one of the locking hole formed in the electrode arrangement surface to hold the insulating protector to the plurality of power storage elements.

10. The connection module according to claim 8, wherein the plurality of positioning projections each include a slanted guide surface that projects further outwards from a respective one of the outer walls when moving in a direction that is along the respective one of the outer walls and that is away from a side of the insulating protector that is mounted to the electrode arrangement surface.

11. The connection module according to claim 8, wherein the plurality of positioning projections are disposed farther away than the bus bar is from a side of the insulating protector that is mounted to the electrode arrangement surface, in a direction perpendicular to the virtual plane.

12. The connection module according to claim 8, wherein a side of the insulating protector that is mounted to the electrode arrangement surface includes indentations at opposing ends of the insulating protector, the indentations receiving the electrode terminals.

13. The connection module according to claim 8, wherein each of the plurality of positioning projections respectively engages with one of a plurality of positioning engagement receptacles to align the bus bar with the adjacent electrode terminals of the plurality of power storage elements.

* * * * *